United States Patent [19]

Gjestrum et al.

[11] Patent Number: 4,686,660
[45] Date of Patent: Aug. 11, 1987

[54] ASSEMBLY FOR USE IN SEISMIC SURVEYS OF THE SEA BED

[75] Inventors: Einar Gjestrum, Boverbru; Inge Dragsund, Ulsteinvik; Just Skog, Farsund; Svein Selvag, Tjorvag, all of Norway

[73] Assignee: Geophysical Company of Norway A/S, Hovik, Norway

[21] Appl. No.: 816,996

[22] Filed: Jan. 9, 1986

Related U.S. Application Data

[63] Continuation of Ser. No. 439,769, Nov. 8, 1982, abandoned.

[30] Foreign Application Priority Data

Nov. 25, 1981 [NO] Norway .................................. 814005

[51] Int. Cl.$^4$ ........................ B63B 21/66; G01V 1/00; G01V 1/38
[52] U.S. Cl. ..................................... 367/153; 367/14; 367/15; 367/144; 367/16; 181/111; 181/120; 114/253
[58] Field of Search ............... 114/244, 245, 246, 248, 114/253; 181/5, 101, 108, 110, 111, 112, 118, 120; 367/6, 14, 15, 16, 18, 19, 20, 21, 24, 106, 130, 141, 144, 153, 154, 169

[56] References Cited

U.S. PATENT DOCUMENTS

| | | | |
|---|---|---|---|
| 2,397,957 | 4/1946 | Freeman | 367/130 X |
| 2,401,929 | 6/1946 | Hammond, Jr. | 114/245 X |
| 2,607,842 | 8/1952 | Reid | 114/244 X |
| 2,610,240 | 9/1952 | Pottort | 114/245 X |
| 2,652,550 | 9/1953 | Lash | 114/245 X |
| 3,275,097 | 9/1966 | Pavey, Jr. | 367/16 X |
| 3,287,691 | 11/1966 | Savit | 367/16 |
| 3,434,451 | 3/1969 | Brainard, II | 114/244 |
| 3,602,878 | 8/1971 | Sullivan | 367/154 X |
| 3,611,975 | 10/1971 | Ashbrook | 367/17 X |
| 3,921,562 | 11/1975 | Kelly | 367/106 X |
| 3,953,826 | 4/1976 | Brundrit et al. | 367/23 X |
| 4,092,629 | 5/1978 | Siems et al. | 367/15 X |
| 4,481,611 | 11/1984 | Burrage | 367/19 |

FOREIGN PATENT DOCUMENTS

| | | | |
|---|---|---|---|
| 2719951 | 11/1978 | Fed. Rep. of Germany | 367/18 |
| 2330018 | 5/1977 | France . | |
| 811256 | 4/1981 | Norway . | |
| 1417948 | 12/1975 | United Kingdom . | |

OTHER PUBLICATIONS

Geco, The Superlong Airgun Array (pamphlet), Geco, Norway, pp. 1-10.
McGraw Hill Dictionary of Scientific and Technical Terms, McGraw-Hill, Inc., N.Y., N.Y., 1974, p. 1432.
Websters New Twentieth Century Dictionary, Unabridged, Second Edition, 1967, p. 1800.

*Primary Examiner*—Deborah L. Kyle
*Assistant Examiner*—Brian S. Steinberger
*Attorney, Agent, or Firm*—Holman & Stern

[57] ABSTRACT

An assembly for use in seismic surveys of the sea bed is towed behind a vessel and comprises groups of seismic signal transmitters which are towed through the water, being suspended from float buoys which are combined to form one body which may be formed as a sleeve having limited flexibility. The body is formed with a head member shaped for reducing resistance to the water, and connected to a coupling point for a tow wire to the vessel, which point lies forward of the head member and at the same depth as the transmitters.

7 Claims, 1 Drawing Figure

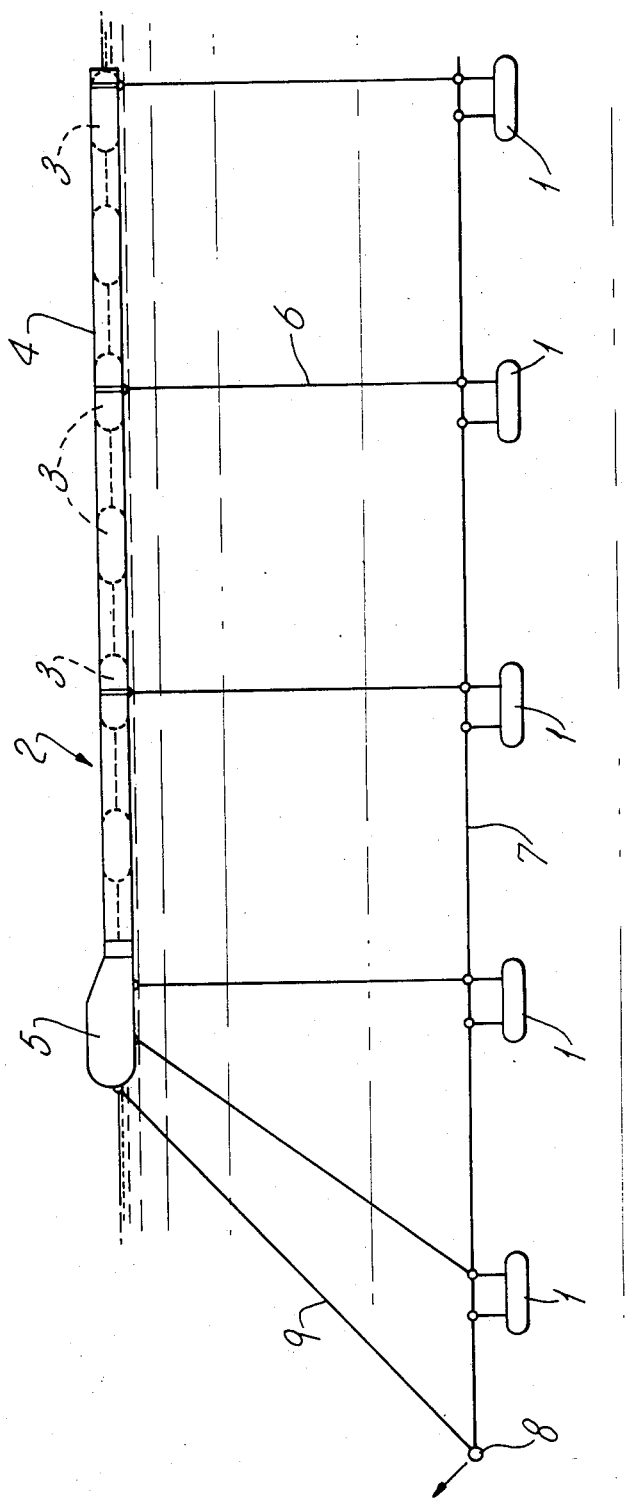

ated air guns generating pulses simultaneously are utilized, being so tuned that pulse train reverberations are compensated/counteracted while the first half period of oscillation is reinforced. The guns are positioned within a restricted area and may be looked upon as a single transmitter which, owing to the cooperative action of the guns, provides a sharp or peaked pulse. Such transmitter sources, which consist of several guns positioned within a restricted area, may be termed point sources. In seismic surveying, several such restricted areas or point sources are streamed out behind a vessel, arranged in an array with one source behind another and/or beside another and towed through the sea. A system which operates according to this principle is described, e.g., in Norwegian Pat. No. 138.922, which corresponds to U.S. Pat. No. 3,953,826.

ASSEMBLY FOR USE IN SEISMIC SURVEYS OF THE SEA BED

This is a continuation of application Ser. No. 439,769 filed 11-8-82 now abandoned.

BACKGROUND OF THE INVENTION

1. Field of the Invention

The invention relates to an assembly for use in seismic surveys of the sea bed from an oceangoing vessel, wherein groups of seismic signal transmitters are towed one behind the other and/or beside each other through the sea, the transmitters being supported and suspended from float buoys.

2. Description of the Prior Art

In seismic explorations of the sea bed, it is necessary to produce data characteristic of the individual earth formations. This is done by utilizing energy sources which emit pressure pulses, which propagate downwardly to the geological stratifications in the sea bed and are reflected back to a receiver and recorded. The pressure pulse transmitters, which normally are air guns or gas guns, are towed behind a vessel, being suspended from float buoys and thus positioned a certain distance beneath the surface of the sea. For each firing, an acoustic cable registers a reflection pattern. By continuous measurement of this reflection pattern, a picture of the geological structure, showing strata, faults, etc., is obtained. The air or gas guns work by releasing a certain volume of air which oscillates approximately as a slowly decaying wave, the period of oscillation being dependent upon the volume of air released. In such pulse reflection from geological formations, it is desirable that the reflection wave obtained have as "peaked" a shape as possible, so that scattering effects may be avoided. Thus, the goal is to obtain as pure a transmitter signal as possible. To obtain this, a plurality of mutually tuned air guns generating pulses simultaneously are utilized, being so tuned that pulse train reverberations are compensated/counteracted while the first half period of oscillation is reinforced. The guns are positioned within a restricted area and may be looked upon as a single transmitter which, owing to the cooperative action of the guns, provides a sharp or peaked pulse. Such transmitter sources, which consist of several guns positioned within a restricted area, may be termed point sources. In seismic surveying, several such restricted areas or point sources are streamed out behind a vessel, arranged in an array with one source behind another and/or beside another and towed through the sea. A system which operates according to this principle is described, e.g., in Norwegian Pat. No. 138.922, which corresponds to U.S. Pat. No. 3,953,826.

To obtain a good reflection signal which is as sharply defined as possible, however, it is important that the transmitters within each restricted area or in each point source are positioned at substantially the same depth. With the conventional streamer systems in use at present, each separate gun in the restricted area is suspended from its own float buoy, and the individual guns may very easily lie at different depths in the water, depending on wave movement. This is unfavourable for obtaining correct results.

A further drawback of such tow systems is the high resistance of the tow to propulsion in the sea. Moreover, the position of the tow point between the vessel and the point source will be of decisive importance both for the individual gun locations and for the resistance to movement through the sea.

BRIEF SUMMARY OF THE INVENTION

The object of the present invention is to remedy the above deficiencies and to provide a tow assembly which ensures that the individual air guns will be located at substantially the same depth in the water, while at the same time the tow resistance or the friction of the tow assembly in the water is reduced to as great an extent as possible. Moreover, the tow assembly shall extend in a substantially straight line, i.e., it shall have as stable a configuration as possible.

These objects are obtained with an assembly wherein the configuration of the float body obtains the desired properties, so that the tow assembly slides more easily through the water, and the tow assembly will be less influenced by wave motion than previously while still having sufficient flexibility not to be broken up by the sea.

BRIEF DESCRIPTION OF THE DRAWING

The invention will now be explained in greater detail in the following with reference to an exemplary embodiment illustrated in the accompanying drawing, which shows a schematic side elevational view of an embodiment of the invention.

DETAILED DESCRIPTION

A plurality of pressure pulse transmitters, for example air guns 1, are towed through the water behind a vessel (not shown), the air guns 1 being held at a predetermined distance, e.g., 4,5 meters, below the surface of the water. A group of for instance five such air guns forms a restricted transmitter region of cooperating air guns, or one pressure source. These guns are supported by a float body 2 which constitutes a combination of separate float bodies for the respective air guns. As shown in the drawing, the air guns are in principle supported by separate float buoys 3, which are indicated with dashed lines in the drawing. A hollow, tubular hose-like sleeve 4 is provided outside these float buoys, which sleeve has limited flexibility and may for instance be formed of the same material as a conventional drain hose. The hose is sealed at one end, and a head member of an especially favorable stream-lined shape, designated by numeral 5 in the drawing, is attached to the other end of the hose. The head member 5 may for example be molded of polyester.

As shown in the drawing, lines 6 are attached to the float body 2 and head member 5, and the air guns 1 are suspended from and fastened to these lines. In turn, the air guns 1 are interconnected by means of a line 7, and the connection cable for firing the air guns to release the pulses is also led along the same path as the line 7. In front of the first air gun 1, and in alignment with the row of air guns, the tow point for mooring the tow assembly to a vessel is disposed. This point is designated by numeral 8 in the drawing. From the tow point 8, a connecting line 9 leads to the front end of the head member 5. The point 8 is preferably arranged such that the angle between the line 7 interconnecting the air guns 1 and the line 9 to the head member is 45°.

With the illustrated embodiment and the illustrated low placement of the tow point, the tow assembly obtains maximum stability in the water and minimum vulnerability to the effects of wave motion, so that the guns 1 are held at the same depth to the greatest extent possible. In choppy seas or waves, the unified float body will to some extent retain its horizontal position in the sea, and owing to its limited flexibility it will be relatively little influenced by the wave motion. The shape of the head member 5 also contributes to favorable tow properties, the head 5 being given a larger dimension than the hose-like, succeeding portion of the float body.

The invention is not limited to the embodiment illustrated herein, and variations in the angle between the tow point and the float body are possible, the essential factor being that the tow point must lie forward of the head member 5. The distances may be varied, and the hose-like sleeve 4 may also be made of a different material. Similarly, it is within the scope of the invention that instead of placing float bodies 3 inside the sleeve, the sleeve could be filled with a float substance and thus form a coherent float body, or a float body subdivided into chambers.

It should be pointed out that the float body must not necessarily be formed in one piece, but can be composed of several sections which are secured together longitudinally by suitable fastening means, so as to form a unified float body of a desired length. The separate sections may themselves be watertight, or they may be connectable lengths of sleeve.

Having desribed our invention, we claim:

1. In a seismic survey system for making seismic surveys of the sea bed, wherein seismic signal transmitters are connected to each other by a transmitter line in relative spaced relationship and are towed behind a vessel by a tow line and are supported by and suspended below the surface of the water from at least one float body, the improvement comprising:

each float body comprises an elongated, flexible, substantially straight tubular sleeve member having a forward end and a rear end, said seismic signal transmitters being air guns;

a plurality of discrete float members disposed in longitudinal spaced relationship within said tubular sleeve member, and a head member having a forward end, a rear end, a streamlined configuration and at least at said forward end of said head member a larger cross-section than said tubular sleeve member adapted to minimize drag through the water attached at the rear end thereof to the forward end of said tubular sleeve member;

a connecting line attached at one end to the front end of said head member; and a coupling point disposed forward of said front end of said head member and at the same depth as said transmitters for coupling the transmitter line and the other end of said connecting line to the tow line of the vessel.

2. The improvement as claimed in claim 1 wherein said member comprises a hose.

3. The improvement as claimed in claim 1 wherein: the seismic signal transmitters are arranged in at least one group of a plurality of transmitters interconnected in longitudinal spaced relationship by a transmitter line having a forward end connected to said coupling point; and said connecting line and transmitter line form an angle of substantially 45°.

4. The improvement as claimed in claim 1 wherein a plurality of transmitters are suspended from said head member.

5. The improvement as claimed in claim 1 wherein said tubular sleeve member comprises a plurality of sections having forward and rear ends connected together end to end.

6. The improvement as claimed in claim 5 wherein said separate sections are watertight.

7. In a seismic survey system for making seismic surveys of the sea bed, wherein seismic signal transmitters are connected to each other by a transmitter line in relative spaced relationship and are towed behind a vessel by a tow line and are supported by and suspended below the surface of the water from at least one float body, the improvement comprising:

each float body comprises an elongated flexible tubular sleeve member having a forward end and a rear end;

a plurality of discrete float members disposed in longitudinal spaced relationship within said tubular sleeve member;

a head member having a forward end, a rear end and a streamlined configuration adapted to minimize drag through the water attached at the rear end thereof to the forward end of said tubular sleeve member, said head member having a larger cross-sectional dimension than said tubular sleeve member;

a connecting line attached at one end to the front end of said head member;

a forward end on the transmitter line; and a coupling point disposed forward of said front end of said head member and at the same depth as said transmitter for coupling said forward end of the transmitter line and the other end of said connecting line to the tow line of the vessel, the transmitter line and connecting line forming an angle of substantially 45°, the transmitters being arranged in at least one group of a plurality of transmitters interconnected in longitudinal spaced relationship by the transmitter line, a plurality of transmitters being suspended from said head member.

* * * * *